Nov. 23, 1954 J. R. ANDERSON 2,695,396

FERROELECTRIC STORAGE DEVICE

Filed May 6, 1952 2 Sheets-Sheet 1

INVENTOR
J. R. ANDERSON
BY [signature]
ATTORNEY

Nov. 23, 1954 J. R. ANDERSON 2,695,396

FERROELECTRIC STORAGE DEVICE

Filed May 6, 1952 2 Sheets-Sheet 2

INVENTOR
J. R. ANDERSON

BY [signature]

ATTORNEY 2,695,396

FERROELECTRIC STORAGE DEVICE

John R. Anderson, Berkeley Heights, N. J., assignor to Bell Telephone Laboratories, Incorporated, New York, N. Y., a corporation of New York Application May 6, 1952, Serial No. 286,276

10 Claims. (Cl. 340—173)

This invention relates to electrical storage devices and more particularly to information storing devices and circuits, of the general type disclosed in the application Serial No. 254,245, filed November 1, 1951, of J. R. Anderson, including ferroelectric elements.

As disclosed in the application above identified, ferroelectric substances, such as barium titanate, when subjected to a polarizing voltage exhibit a relation between electrostatic polarizing force and polarization of the general form of the hysteresis loop exhibited by ferromagnetic materials. Condensers comprising a slab of ferroelectric material and a pair of electrodes on opposite faces of the slab are utilizable to particular advantage as memory or storage elements. The operation of such condensers for this purpose involves, in general, polarizing the ferroelectric in one direction, applying a pulse of the polarity to reverse the polarization, whereby information is stored, and then applying read out pulses of the opposite polarity thereby to restore the initial polarization.

Thus, each cycle, for example the storage and reading out of the information due to the storing pulses, which information may be in the form of binary digits "1" and "0," results in destruction of the stored information. Also the energy requisite to polarize the ferroelectric element to saturation is relatively large.

One object of this invention is to enable repeated reading out of information from ferroelectric storage devices.

Another object of this invention is to reduce the energy required to saturate such devices.

In accordance with one feature of this invention, two ferroelectric condensers are associated to constitute a storage element which saturates at a relatively low voltage and which is capable of being subjected to repeated read outs, millions of times in typical cases, without destruction of the stored information.

In one illustrative embodiment of this invention, a storage device comprises a pair of ferroelectric condensers electrically in series and means for polarizing the two condensers in opposite directions. A source is associated with the condensers to apply to the two in series a pulse or pulses of the polarity to reverse the direction of polarization of one of the condensers without changing the direction of polarization of the other condenser, whereby information, corresponding, for example, to the binary "1" is stored. Read out pulses of the opposite polarity then are applied to the condensers by way of a differentiating network whereby an output pulse is produced for each read out pulse and the stored information is retained by the device.

The invention and the above noted and other features thereof, will be understood more clearly and fully from the following detailed description with reference to the accompanying drawing, in which.

Figure 1:
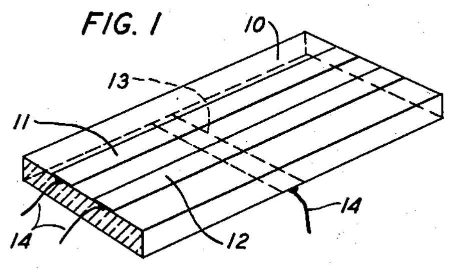
Fig. 1 is a perspective view of a double ferroelectric condenser storage element illustrative of one embodiment of this invention.

Referring now to the drawing, the storage element illustrated in Fig. 1 comprises a plate or slab 10 of ferroelectric material, for example of barium titanate and 0.005 inch thick by one-eighth inch square, a pair of parallel strip electrodes about 0.01 inch wide or terminals 11 and 12 on one face of the plate or slab, and a third electrode 13 on the other face. The electrodes may be of fixed silver paste and having leading in conductors 14 affixed thereto, as by soldering. The element constitutes two distinct ferroelectric condensers one having terminals 11 and 13 and the other having terminals 12 and 13.

Figure 2:
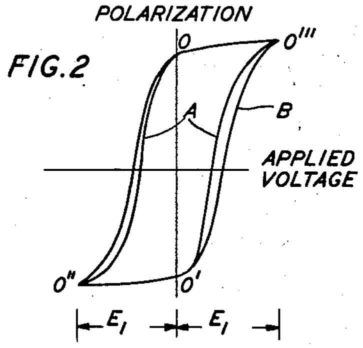
Figs. 2 and 3 are graphs depicting hysteresis loops for a double condenser element such as illustrated in Fig. 1 for different conditions of polarization.
Figure 3:
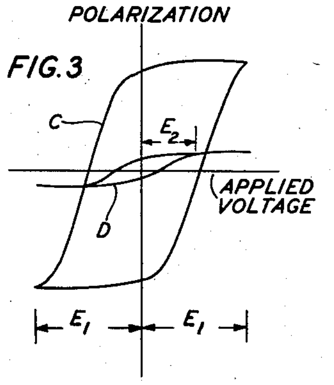

The individual polarization loops for the condensers are depicted in Fig. 2, wherein the abscissae are applied voltage and the ordinates are polarization. The inner loop A is for the condenser having the terminals 11 and 13 and the outer loop B is for the condenser having terminals 12 and 13. As seen, both condensers saturate at a voltage $E_1$. If the polarizing voltage is applied between the terminals 11 and 12, the loop depicted at C in Fig. 3 is obtained. The area of the loop C is substantially greater than that for the individual condenser loops A and B of Fig. 2, corresponding to that for a ferroelectric element of about double the thickness of those having the latter loops.

When, however, the two condensers are polarized in opposite directions at or substantially at saturation, and then are energized in series, the loop for the two approaches a straight line. If the two condensers were exactly identical, the polarization versus voltage characteristic would be a straight line and the two condensers would constitute, in effect, a capacitance of magnitude equal to the minimum of the two condensers in series and when unpolarized. This phenomenon occurs because the changes in charges on the two oppositely polarized elements, when a voltage is applied to the two in series, cancel each other. This ideal condition, that is a linear polarization-voltage characteristic, is difficult to realize practically because of the requirement for absolute matching of the two condensers. However, for practical purposes in devices constructed in accordance with this invention an approximate matching of the two condensers is satisfactory.

A typical loop for an element of the construction portrayed in Fig. 1, with the condensers having terminals 11, 13 and 12, 13 respectively and polarized oppositely at about $E_1$, is represented at D in Fig. 3, it being understood that the abscissae are voltage applied between terminals 11 and 12. Particularly to be noted are the small area of the loop D and the fact that for the two oppositely polarized units in series the saturation voltage is substantially smaller than that for either ferroelectric condenser. For the particular device represented, the saturation voltage $E_2$ for the two condensers in series was about 65 per cent of that for the individual condensers. Viewed in one way, then, the two oppositely polarized condensers define a single storage element having a substantially lower saturating voltage.

Figure 4:
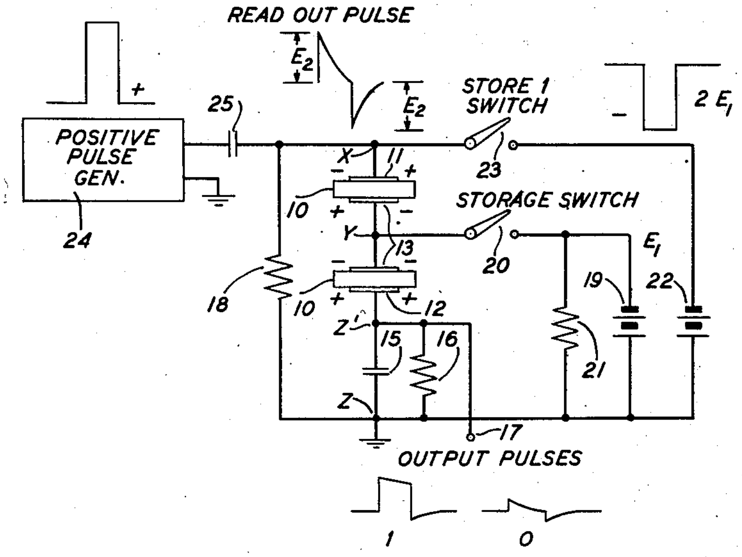
Fig. 4 is a diagram of a multiple read out storage circuit constructed in accordance with this invention.

The characteristic above described can be utilized to provide a storage element from which stored information can be read out an almost unlimited number of times. A typical circuit for this purpose is shown in Fig. 4 wherein the two ferroelectric condensers are illustrated as physically separate. Such they may be, or they may be of the construction portrayed in Fig. 1 and described hereinabove. The two condensers are connected in series relation between terminals X and Z and in series with the parallel combination of condenser 15 and resistor 16 to one side of which an output terminal 17 is provided as shown. Also connected between the terminals X and Z is a resistor 18, the function of which will appear presently.

The two ferroelectric condensers may be polarized in opposite directions, the polarities being indicated by the + and − signs adjacent and to the right of the condensers in Fig. 4, from a source 19 over a switch 20, the source having a high resistance 21 bridged thereacross. The switch may be of any one of a variety of types and constructions but should have a very high resistance in the open condition. The voltage of source 19 should be substantially equal to or greater than the saturation voltage $E_1$ for the ferroelectric condensers. Pulses to be stored are applied to the two condensers in series from a source 22 over the switch 23, the pulses being of amplitude substantially $2E_1$, and negative as indicated.

Read out pulses, of positive polarity as indicated, are applied to the two ferroelectric condensers in series from a source 24 and through a condenser 25. The condenser 25 and resistor 18 differentiate these pulses thereby to provide a positive and a negative pulse of amplitude $E_2$ between terminals X and Z, as indicated diagrammatically above terminal X in Fig. 4, for each read out pulse from source 24.

A binary "0" is stored in the ferroelectric condensers by closing switch 20 whereby, as noted hereinabove, a voltage $E_1$ is applied at terminal Y and the two condensers are polarized in opposite directions.

A binary "1" is stored by applying a negative pulse of amplitude $2E_1$ from source 22 while switch 20 is closed. The latter then is opened slightly before the end of the negative storing pulse. As a result, both ferroelectric condensers are polarized in the same direction as indicated by the + and — signs to the left of and adjacent the condensers in Fig. 4. As is apparent, the direction of the polarization of one condenser, the upper one in Fig. 4, is reversed whereas the other condenser remains polarized in the initial direction.

When a read out pulse is applied and a binary "0" is stored in the condensers neither the positive nor the negative portions of the differentiated read out pulse reverses the directions of the polarities of the condensers. The condensers present a low capacitance to the read out pulse so that at best a very small output voltage obtains between terminal 17 and ground.

When, however, the binary "1" is stored in the condensers and a read out pulse is applied, the positive portion of the differentiated pulse reads out the stored information and the negative portion in effect restores the binary "1." When the binary "1" is in storage, the ferroelectric condensers present a high capacitance so that, upon application of the read out pulse, a high voltage is produced between the output terminal 17 and ground.

The operation above described may be understood from an analysis of the conditions of the condensers with reference to Figs. 2 and 3. When the binary "0" is stored, one ferroelectric condenser may be considered as at point 0 in Fig. 2 and the other as at point $0^1$. Application of read out pulses does not alter these conditions. Substantially no net change occurs in the charge of the two condensers in series.

When a binary "1" is stored, the condenser which was at condition 0 is changed to $0^1$ via $0^{11}$; the other condenser remains, in effect, at $0^1$. Now when a read out pulse is applied, on the positive half portion of the differentiated read out pulse both condensers go to condition 0 via $0^{111}$ and on the negative portion of the differentiated pulse both return to condition $0^1$ via $0^{11}$.

Thus, it will be appreciated that the information, in the form of either the binary "0" or the binary"1" remains stored without substantial diminution by the read out pulse and, hence, this information may be read out repeatedly.

In a specific, illustrative circuit of the configuration illustrated in Fig. 4 and described hereinabove, the ferroelectric condensers were of barium titanate single crystals, about 0.005 inch thick and having electrodes of about .0007 square inch in area and the other circuit parameters were as follows:

$E_1$=60 volts
$E_2$=50 volts
Condenser 25—50 mmf.
Resistor 18—10,000 ohms
Condenser 15—2,000 mmf.
Resistor 16—10,000 ohms
Resistor 21—20,000 ohms and the read out pulses before differentiation were of 18 microseconds duration. The output pulse for a stored binary "0" was about 0.5 volt and the output pulse for a stored binary "1" was 2.2 volts. For this circuit, no change in output voltage for a binary "0" was discerned after 35 million read outs. For a stored binary "1" the output voltage decreased only from 2.2 volts to 1.5 volts after 35 million read outs.

It will be appreciated that the magnitude of the output voltage is dependent upon the capacitance of the condenser 15 and can be increased by decreasing the capacitance. The resistance-condenser combination 16, 15 determines the shape of the output pulse. The particular values of these elements given above provide a generally square output pulse of the form indicated below terminal 17 in Fig. 4. Although, as indicated above, the specific circuit was operated primarily with read out pulses of 18 microsecond duration, the same circuit has been operated with such pulses of lengths down to 1 microsecond without substantial degradation in circuit performance.

Figure 6:
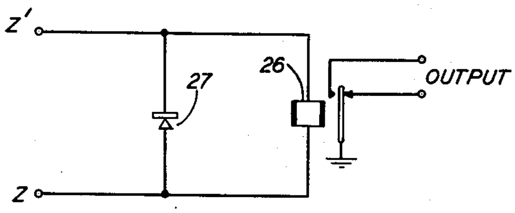

The circuit of Fig. 4 may be utilized with a relay output such as illustrated in Fig. 6 and comprising the polar relay 26 shunted by the diode 27. This combination is connected between the terminals ZZ' of Fig. 4 in place of the resistance 15 and condenser 16 and, for the polarity indicated the relay operates in response to read outs of the binary "1." For such operation, the positive portion of the read out pulse should be longer than the operating time of the relay 26.

Figure 5:
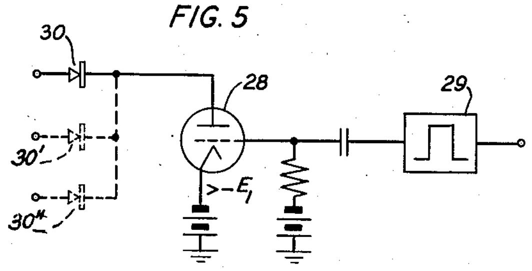
Figs. 5, 6 and 7 portray modifications of portions of the circuit illustrated in Fig. 4.

A suitable electronic switch for use as the element 20 in Fig. 4 is illustrated in Fig. 5 and comprises the discharge device 28 biased beyond cut off and adapted to be triggered by pulses from a pulse source 29 to produce a voltage $E_1$ at terminal Y. The anode of the device 28 is connected to the terminal and by way of a diode 30. Such a switch may be utilized to operate concurrently upon a number of storage circuits by the provision of additional diodes 30' and 30'' as shown in phantom in Fig. 5.

Figure 7:
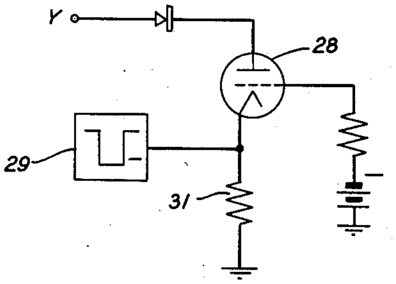

In some cases, electronic switches such as illustrated in Fig. 5 evidence increasing leakage after a million or so operations so that the open condition resistance of the switch decreases to result in degraded performance of the storage circuit. Increased lifetime of uniform operation is attained with a switch of the configuration illustrated in Fig. 7 wherein the discharge device 28 is biased at cut off and is triggered by negative store pulses from the source 29 applied across the cathode resistor 31.

What is claimed is:

1. In a ferroelectric storage circuit, a pair of condensers connected in series, each of said condensers having a dielectric of a ferroelectric material, means for applying a voltage to the connection between said condensers to polarize the dielectrics of the two condensers in opposite directions, means for reversing the polarization of one of said dielectrics when information is to be stored in said condensers, whereby the polarizations of said dielectrics are of the same direction, and means for reading out information stored in said condensers in series comprising means applying a voltage across said condensers in series sufficient to reverse the polarizations of both of said dielectrics if they are polarized in the same direction.

2. In a ferroelectric storage circuit in accordance with claim 1, means for returning said dielectrics to their immeditely prior condition of polarization after application of said reading out voltage.

3. In a ferroelectric storage circuit in accordance with claim 2, wherein said means for reading out information and said means for returning said dielectrics to their prior condition comprises differentiation circuit means, means applying a pulse of a polarity to read out said information to said differentiation circuit means, and means applying the output of said differentiation circuit means across said condensers in series.

4. A storage device comprising a pair of condensers connected in series, said condensers each having a dielectric of a ferroelectric material, an output element connected to one of said condensers, means applying a first voltage across said condensers in parallel to polarize said dielectrics in opposite directions, means applying a voltage across the other of said condensers alone to reverse the direction of polarization of the dielectric of said other condenser, whereby one binary value is stored in said condensers when said dielectrics are polarized in opposite directions and the other binary value is stored in said condensers when said dielectrics are polarized in the same direction, and means applying a pulse across said condensers in series capable of reversing the polarization of said dielectrics when said dielectrics are both polarized in the same direction.

5. A storage device in accordance with claim 4 further comprising means for applying a pulse across said condensers in series capable of returning the polarization of said dielectrics to their immediately prior condition after application of said last priorly mentioned pulse.

6. A storage device comprising a pair of condensers each having a ferroelectric dielectric and connected in series, an output element coupled to said condensers, means for polarizing said dielectrics in opposite directions, means for impressing pulses of one polarity across one of said condensers to reverse the polarization of the dielectric of said one condenser and means for applying across said condensers in series and in sequence a pulse of the opposite polarity and a pulse of said polarity, said last mentioned pulses being of a magnitude sufficient to reverse the polarization of said dielectrics.

7. A storage circuit comprising a pair of condensers in series, said condensers each having a dielectric of a ferroelectric material, an output element in series with said condensers, means for polarizing said dielectrics in opposite directions including a source for supplying a saturating voltage to each condenser, means for applying to one of said condensers a saturating voltage pulse to reverse the polarization of the dielectric of said one condenser, whereby said dielectrics are polarized in the same direction, and means comprising a source of voltage pulses and a differentiation circuit for applying to said condensers in series a pulse having substantially equal positive and negative portions of amplitude less than the saturation voltage for said units in series.

8. A storage circuit comprising a slab of ferroelectric material, a pair of electrodes on one face of said slab, a single electrode on the other face of said slab, said single electrode defining with each of said pair of electrodes a condenser having the interposed ferroelectric material as the dielectric thereof, means for applying a voltage to said single electrode to polarize said dielectrics in opposite directions, means for applying a voltage between said single electrode and one of said pair of electrodes for reversing the polarization of one of said dielectrics, whereby the polarizations of said dielectrics are of the same direction, and means applying a voltage between said pair of electrodes sufficient to reverse the polarization of both of said dielectrics if said dielectrics are polarized in the same direction.

9. A storage circuit comprising a slab of ferroelectric material, a pair of electrodes on one face of said slab, a single electrode on the other face of said slab, said single electrode defining with each of said pair of electrodes a condenser having the interposed ferroelectric material as the dielectric thereof, means for applying a saturating voltage to said single electrode and one of said pair of electrodes for reversing the polarization of one of said dielectrics, whereby said dielectrics are polarized in the same direction, and means comprising a source of voltage pulses and a differentiation circuit for applying between said pair of electrodes a pulse having substantially equal positive and negative portions of amplitude somewhat less than the saturation voltages for said units individually.

10. A circuit comprising a pair of condensers in series, said condensers each having a dielectric of a ferroelectric material, an output element connected to one of said condensers, means applying voltages across said condensers individually to polarize said dielectrics in opposite directions, means applying a voltage across one of said condensers to reverse the polarization of the ferroelectric material comprising the dielectric thereof, whereby said dielectrics are polarized in the same direction, and means applying a voltage across both of said condensers sufficient to reverse the polarization of both of said dielectrics and transmit a pulse to said output element.

References Cited in the file of this patent

UNITED STATES PATENTS

| Number | Name | Date |
|---|---|---|
| 2,519,513 | Thompson | Aug. 27, 1950 |
| 2,531,076 | Moore | Nov. 21, 1950 |
| 2,545,349 | Foster | Mar. 13, 1951 |
| 2,594,449 | Kircher | Apr. 29, 1952 |
| 2,618,753 | Van Mierlo | Nov. 18, 1952 |

OTHER REFERENCES

Proc. of IRE, "Magnetic Delay-Line Storage" by An Wang (pages 401–407), April 1951.

Journal of Applied Physics, "Static Magnetic Storage and Delay Line" by An Wang et al. (pages 49–54), Jan. 1951.